Feb. 21, 1956

C. V. ZANIN 2,735,697

SEALED REDUCER JOINT BETWEEN PIPES

Filed Jan. 12, 1953

INVENTOR
Clarence V. Zanin

United States Patent Office 2,735,697
Patented Feb. 21, 1956

2,735,697
SEALED REDUCER JOINT BETWEEN PIPES

Clarence V. Zanin, Clarendon Hills, Ill.

Application January 12, 1953, Serial No. 330,765

1 Claim. (Cl. 285—22)

This invention relates to well seals, and has for an object thereof the provision of a well seal which will fit several sizes of well casings and is adaptable to fit several sizes of pipes to be strung in well casings.

In the use of pumps of the Venturi type, well casings must be sealed tightly. This has necessitated, in the past, well seals of several different sizes, one complete seal for each size of casing used in the industry and others for the different sizes of pipe to be strung in the casings.

A well seal forming one embodiment of the invention may include a cap provided with a plurality of concentric grooves designed to receive any of a plurality of casings of different sizes. A pressure plate may be pulled toward the cap to press a thick, resilient gasket tightly against a casing and tightly around a pipe extending through holes in the cap, the gasket and the pressure plate. The pipe may be provided with a flanged collar designed to fit closely within the holes in the cap, the gasket and the pressure plate.

Figure 1:
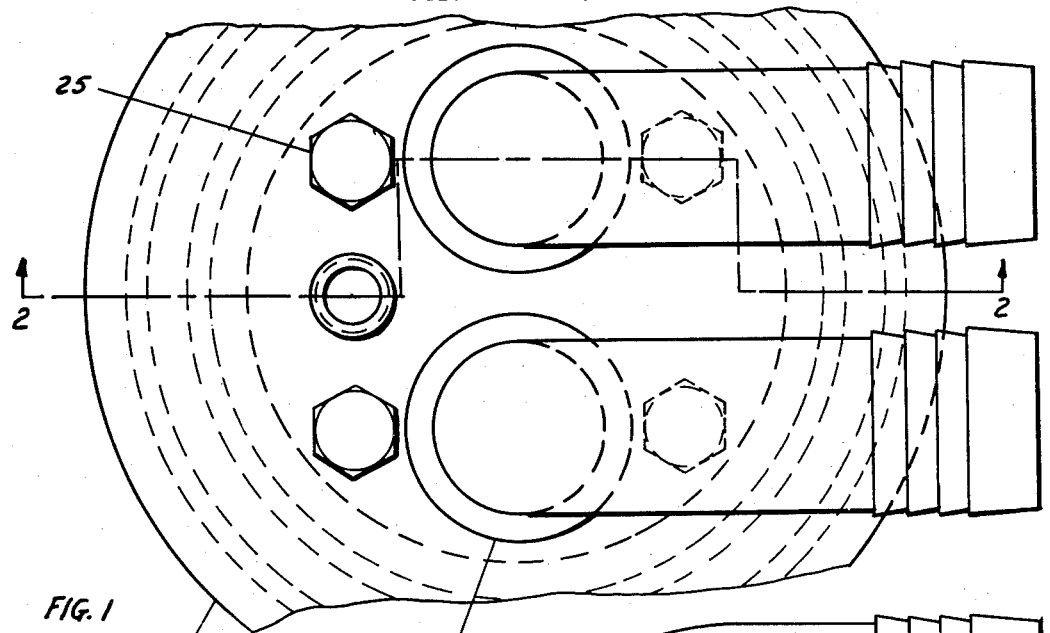
Figure 2:
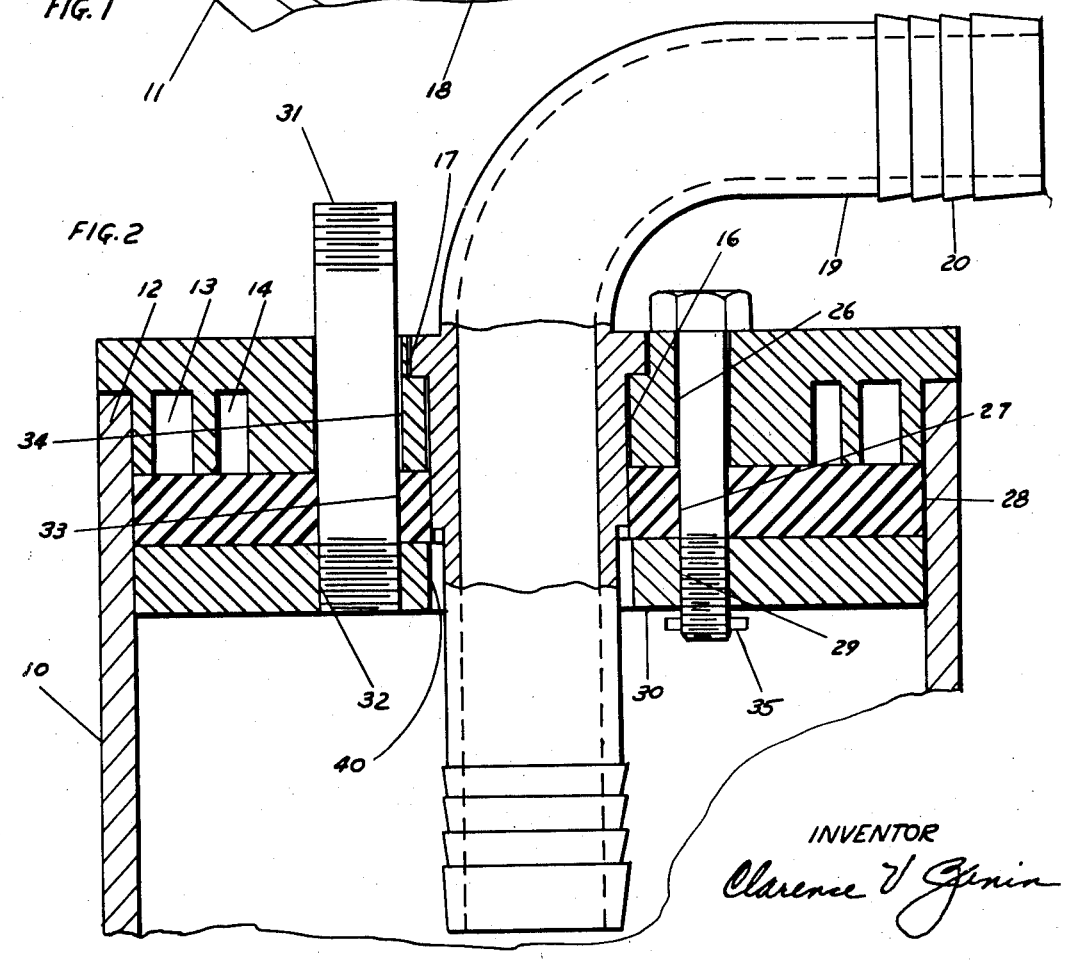

A complete understanding of the invention may be obtained from the following detailed description of a well seal forming a specific embodiment thereof, when read in conjunction with the appended drawings, in which Fig. 1 is a fragmentary, top plan view of a well seal forming a specific embodiment of the invention, and Fig. 2 is a vertical section taken along line 2—2 of Fig. 1.

Referring now in detail to the drawings, there is shown therein a well seal for closing hermetically the top of a well casing 10. The seal includes a cap 11 provided with concentric grooves 12, 13 and 14 on the under face thereof, each designed to receive a well casing of a different size. Bores 16 and counterbores 17 in the cap are designed to receive flanged collars or bushings 18 formed integrally with elbows 19. The elbows are provided with ribbed end portions 20 on which plastic pipes may be clamped by conventional bands (not shown).

Cap screws 25 extending through bores 26 formed in the cap and bores 27 formed in a resilient, impervious sealing gasket 28 are threaded through tapped bores 29 formed in a pressure plate 30. A vent pipe 31 threaded into a tapped bore 32 in the plate 30 projects upwardly through a bore 33 in the gasket and a bore 34 formed in the cap. Cotter pins 35 carried in bores in the cap screws prevent dropping the pressure plate and the gasket in the casing. The pressure plate 30 is provided with holes 40 fitting loosely around the elbows 19, and, when drawn toward the cap, presses the gasket 28 tightly around the collars 18 of the elbows and tightly against the inside periphery of the well casing 10.

The above-described seal is designed to fit well casings of the three standard sizes, the inner groove 12 being designed to receive the smallest of the casings, the middle groove 13 being designed to receive the casings of intermediate size and the outer groove 14 being designed to receive the largest well casings. Similarly, the gasket 28 fits the largest casing and may be replaced by one of smaller gaskets of proper sizes for the smaller sizes of casings. Thus, the seal, for the purpose of merchandizing, may be made up in a very small and economical kit consisting of the elements shown, elbows of different diameters than the elbows 19 but having flanged collars of the same external size as the flanged collars 18, and two extra each of gaskets and pressure plates designed to fit the smaller sizes of casings.

The above-described seal may be variously modified without departing from the spirit and scope of the invention as defined by the claim.

What is claimed is:

A well seal comprising a cap provided with a plurality of concentric grooves of different diameters opening on one face thereof, a bore and a counterbore opening on the other face thereof inside the innermost groove, the bore extending completely through the cap, a pipe connector having a flanged collar thereon fitting into the bore and the counterbore, a well casing received into one of the grooves of the cap, a resilient gasket fitting around the collar and extending laterally at least to the inner rim of the well casing, and means for pressing the gasket tightly against the grooved face of the cap and laterally against the well casing and the pipe connector.

References Cited in the file of this patent

UNITED STATES PATENTS

| | | |
|---|---|---|
| 1,507,269 | Backmire | Sept. 2, 1924 |
| 1,512,619 | MacClatchie | Oct. 21, 1924 |
| 1,684,582 | Hoaglund | Sept. 18, 1928 |
| 2,132,199 | Yancey | Oct. 4, 1938 |
| 2,237,680 | Mark | Apr. 8, 1941 |
| 2,562,946 | Read | Aug. 7, 1951 |